Jan. 2, 1934.  L. E. PADELFORD  1,941,998
BREAD BOX
Filed May 11, 1931  4 Sheets-Sheet 1
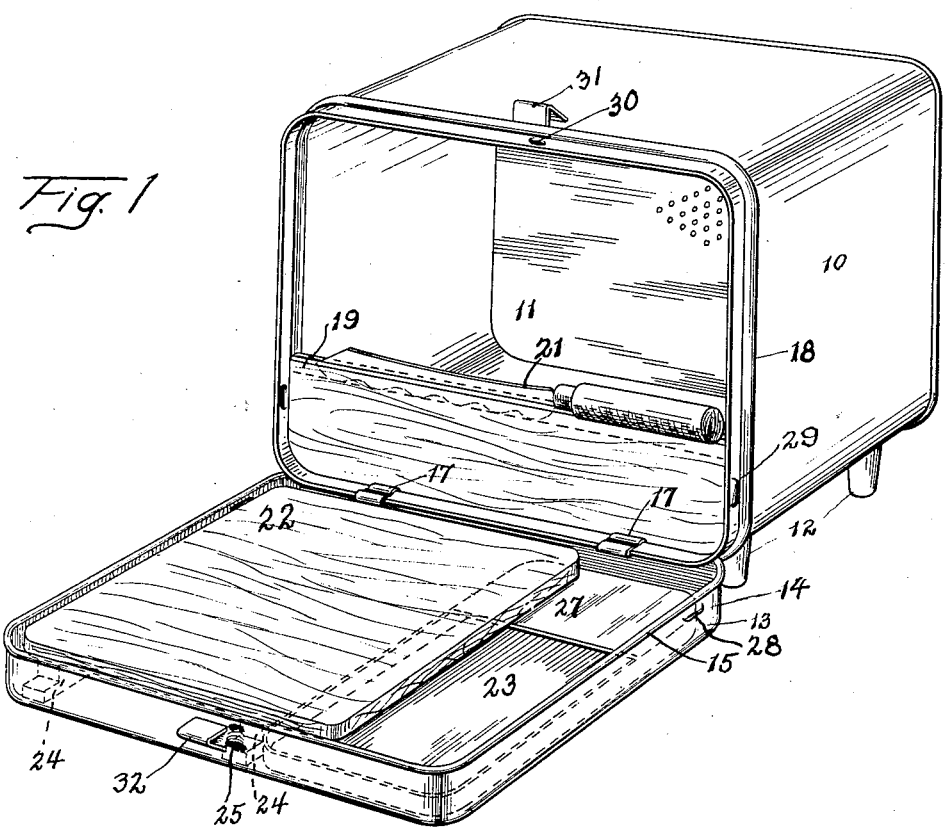
Fig. 1
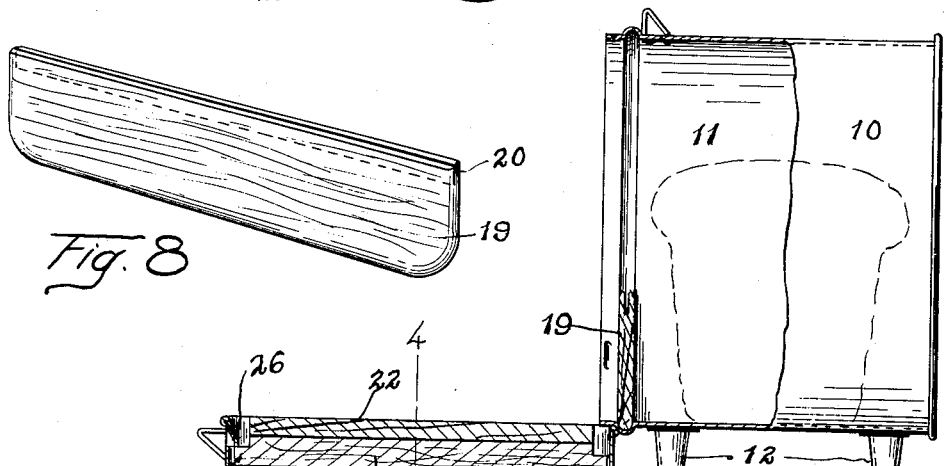
Fig. 8
Fig. 3
INVENTOR.
Lester E. Padelford
BY Joseph Darley
ATTORNEY.

Jan. 2, 1934.  L. E. PADELFORD  1,941,998
BREAD BOX
Filed May 11, 1931  4 Sheets-Sheet 2
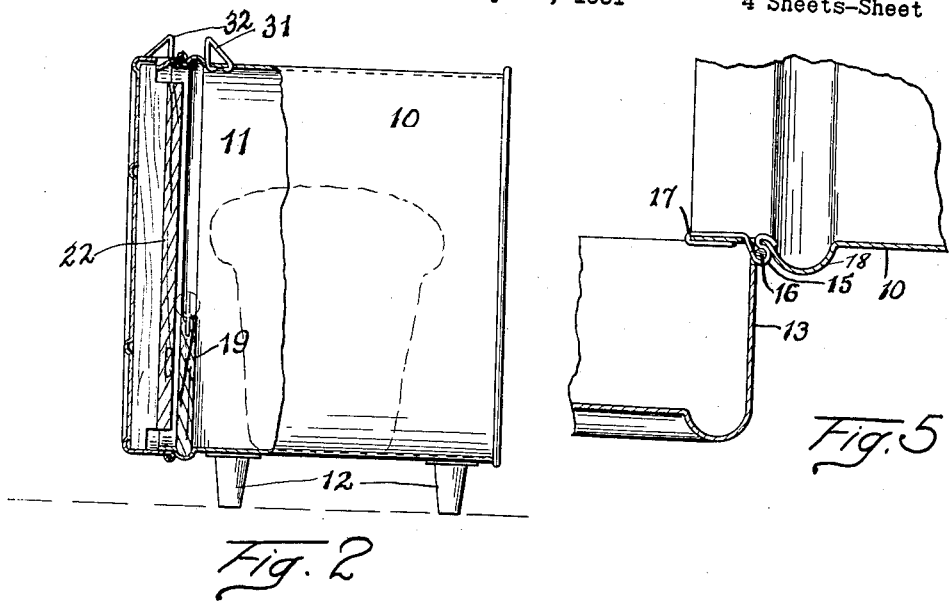
Fig. 2
Fig. 5
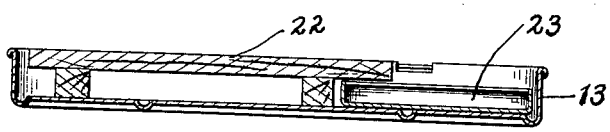
Fig. 4
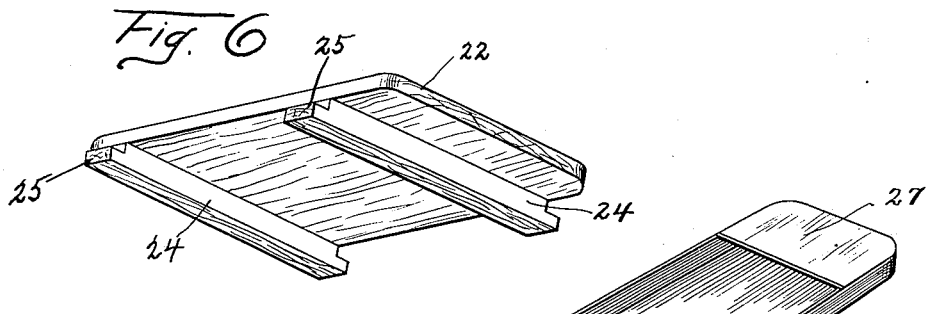
Fig. 6
Fig. 7
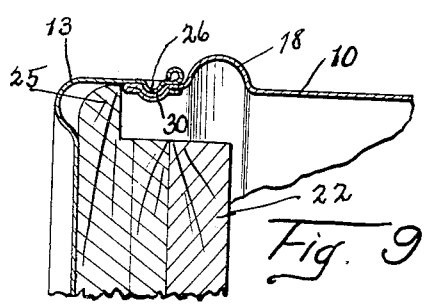
Fig. 9
INVENTOR.
Lester E. Padelford
BY Joseph Farley
ATTORNEY.

Jan. 2, 1934. L. E. PADELFORD 1,941,998
BREAD BOX
Filed May 11, 1931 4 Sheets-Sheet 3
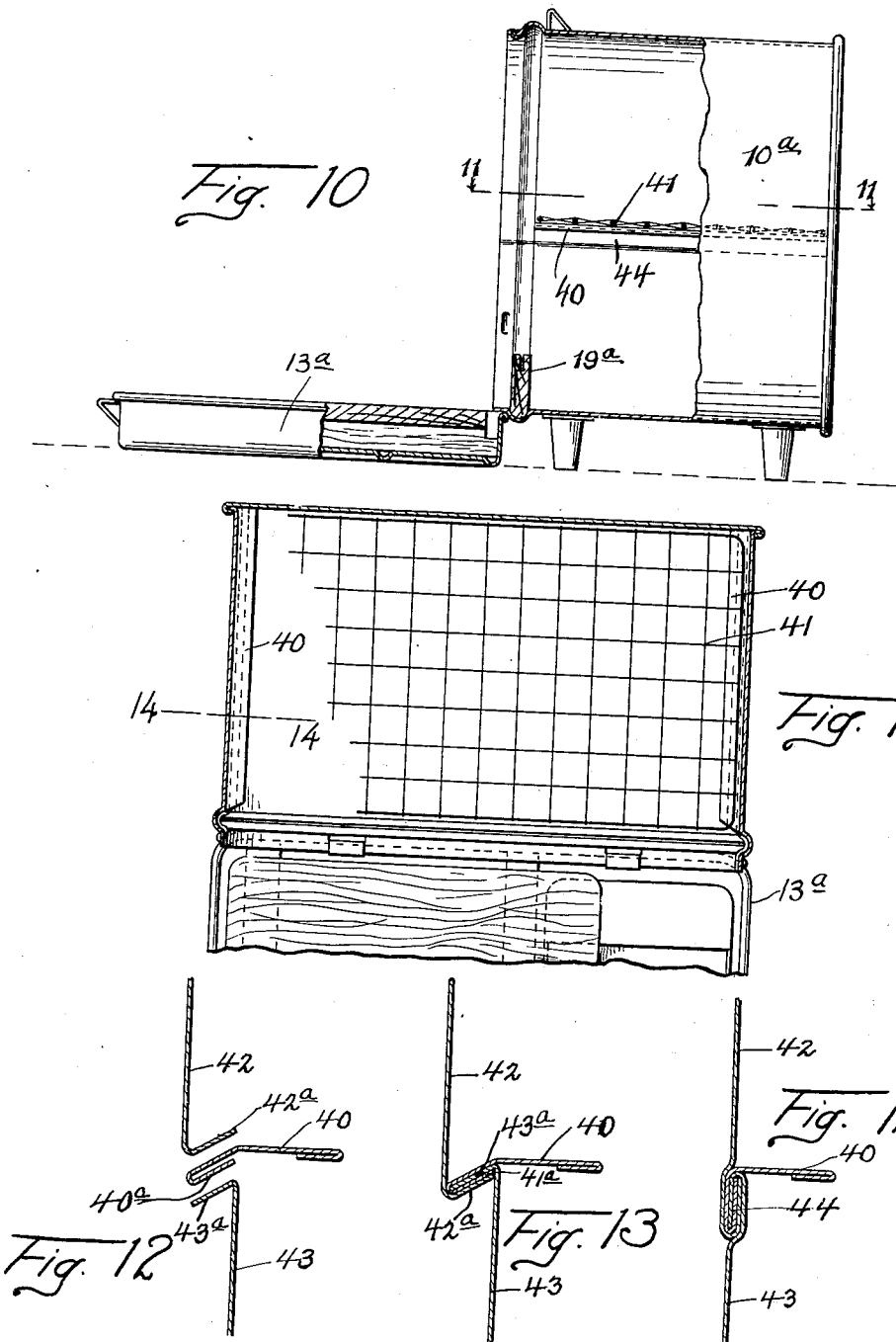
INVENTOR.
Lester E. Padelford
BY Joseph Farley
ATTORNEY.

Jan. 2, 1934.   L. E. PADELFORD   1,941,998
BREAD BOX
Filed May 11, 1931   4 Sheets-Sheet 4

INVENTOR.
Lester E. Padelford
BY
Joseph Harley
ATTORNEY.

Patented Jan. 2, 1934

1,941,998

UNITED STATES PATENT OFFICE 1,941,998

BREAD BOX

Lester E. Padelford, Buffalo, N. Y., assignor to Republic Metalware Company, Buffalo, N. Y., a corporation of New York Application May 11, 1931. Serial No. 536,357

5 Claims. (Cl. 45—71)

This invention relates to household devices and particularly to receptacles of the type known as bread boxes.

The principal object of the present invention is to provide a new and improved construction for a bread box in which all of the essential tools or appurtenances for enabling the housewife to prepare the bread for serving are grouped together in a compact unitary assembly and so arranged that they will be used instinctively with a minimum amount of unnecessary motion or physical effort.

Stated more specifically it is the primary object of the present invention to group and arrange in a compact unitary assembly a storage compartment for bread, cake or the like, a bread board or tray upon which the foodstuffs can be placed for cutting or slicing the same, a receptacle for collecting the crumbs resulting from such cutting or slicing, and a holder for the slicing knife; the auxiliary devices being arranged relatively to one another in the most advantageous way for ready use and accessibility, and such auxiliary devices being co-operatively associated with the main storage receptacle so as to reinforce and strengthen the same while at the same time being detachably secured thereto.

Other objects of the invention relate to specific constructional details by means of which various parts of the main receptacle are employed to retain the auxiliary devices in proper position and also are employed to strengthen the receptacle, or to provide means for holding the cover of the receptacle in closed position.

A further object of the invention is to provide a new and improved construction of means for supporting a shelf within the receptacle and also to provide a new and improved method for forming such means as a step in the method of assembling the component parts of such receptacle.

Another object is to so construct a crumb tray and associate it with the bread board within the cover of a bread box that crumbs on the board will be caused to gravitate to the crumb tray and be retained therein by the act of closing the cover of the box.

The above and other objects of the invention will appear more fully from the following more detailed description and by reference to the accompanying drawings forming a part thereof; and wherein Fig. 1 is a front perspective view of a receptacle constructed in accordance with the principles of the present invention;

Fig. 2 is a side elevation, partly in section, of the receptacle shown in Fig. 1 with the cover thereof in closed position;

Fig. 3 is a view similar to Fig. 2 showing the cover in open position;

Fig. 4 is a section on the line 4—4 of Fig. 3;

Fig. 5 is an enlarged sectional detail showing the hinged connection between the receptacle and cover;

Fig. 6 is a perspective view of the bread board detached from the cover;

Fig. 7 is a similar view of the crumb tray;

Fig. 8 is a perspective view of the combined knife holder and front board for retaining the bread within the receptacle;

Fig. 9 is an enlarged sectional detail of the means for retaining the cover in closed position;

Fig. 10 is a side elevation, partly in section, of a modified form of construction.

Fig. 11 is a section on the line 11—11 of Fig. 10;

Figs. 12, 13 and 14 are views taken on the line 14—14 of Fig. 11 and showing the steps of the method of assembling the parts of the receptacle which form the sides thereof and which secure in position the supporting members or brackets for a removable shelf, said brackets being secured by a seaming-in process.

Figure 15:
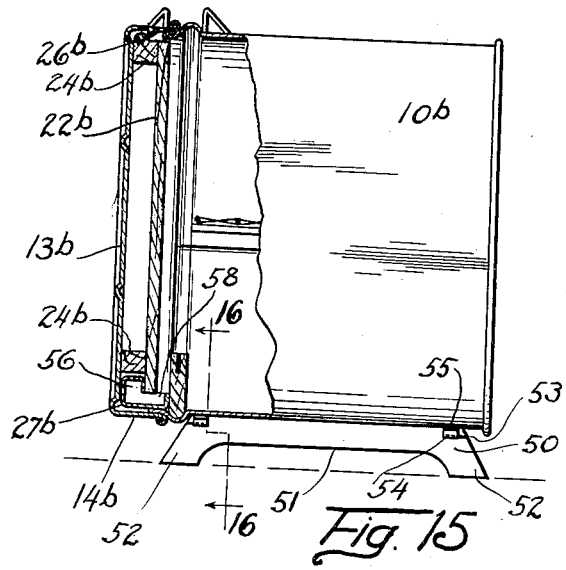
Fig. 15 is a view similar to Fig. 2 of a modified construction.

As shown in Figs. 1 to 9 inclusive of the drawings, the numeral 10 indicates the main body portion of the bread box or receptacle which forms an inner storage compartment 11 in which the bread is adapted to be stored. The receptacle 10 is preferably provided with a plurality of supporting posts or legs 12 adapted to support the receptacle upon any suitable supporting surface so that it is spaced from said surface a sufficient distance to permit the cover 13 to be opened to a horizontal position and to rest in such position upon said supporting surface. The cover 13 is of the usual flanged construction and the flange 14 thereof is provided around its outer edge or perimeter with a rolled or beaded edge 15; a strengthening wire 16 preferably being retained within said beaded edge. A pair of hinge brackets 17 are clamped in interlocked engagement with one edge of the receptacle 10 and are bent around the wire 16 to connect the cover 13 in pivotally, or hinged, relationship to the receptacle 10.

Extending around the side of the receptacle 10, adjacent to the outer edge thereof is a bead 18, which forms on the inner side of the receptacle a groove or recess for a purpose presently to appear, and also for the purpose of strengthening the receptacle at its outer edge and maintaining such edge substantially rigid. The bead 18 serves as a stop for limiting the closing movement of the cover 13 and for forming, with the surrounding edge 15 of the latter, a tight closure that will prevent undue access of air to the receptacle and will also prevent insects or vermin from obtaining access to the interior of the receptacle when it is closed. The groove or recess formed by the bead 18 on the interior of the receptacle 10 also serves to retain in place a front board 19. This front board is provided on its upper edge with a longitudinally extending groove 20 into which groove the blade of a bread knife 21 is adapted to be placed; the pocket formed by the groove 20 forming a sheath for the knife to enclose the cutting edge thereof and prevent the hands of the user from accidentally striking the cutting edge of said knife when reaching into the storage compartment 11. The front board 19 performs a threefold function, it serves as a receptacle for the knife 21; it retains material within the storage compartment, and also, in co-operation with the bead 18, it strengthens and preserves the rigidity of the outer edge of the receptacle 10.

The cover 13, with its peripheral flange 14, forms a shallow compartment in which are received a bread board 22 and a crumb tray 23. The bread board 22, as shown in Fig. 6, is provided on its underside with a pair of strengthening cleats 24, the ends of which are kerfed to provide the laterally projecting ears 25. One, or more, of these ears 25 is adapted to co-operate with one or more lugs or indentations 26 formed in the peripheral flange 14 of the cover 13 for retaining the bread board in position within the shallow compartment formed by said cover. In the drawings, but one of said lugs or indentations 26 have been shown, but it will be understood that one could be provided for each of the ears 25, if desired.

The crumb tray 23, as shown in Fig. 1, is adapted to seat within the shallow compartment of the cover, with the bread board 22 in overlapping relationship thereto, the bread board serving to hold the tray in position within the cover. The tray 23 may be of any suitable construction, but, as shown, is preferably of sheet metal flanged to provide an open receptacle. Secured to one end of the flange of the tray 23, is a top closure plate 27 that forms with the tray a pocket into which the crumbs will naturally gravitate when the cover 13 is moved from opened to closed position.

Arranged at suitably spaced points about the peripheral flange 14, of the cover 13, is a plurality of locking detents 28, adapted to co-operate with suitably formed indentations 29 formed in the material of the receptacle 10 adjacent to the edge of said receptacle.

The lug 26 employed for holding the bread tray 22 within the cover 13 is also preferably used as a catch for yieldingly holding the cover in closed position; the receptacle 10 being provided with a notch or indentation 30 which, as most clearly shown in Fig. 9, is detachably interlocked with the lug 26 when the cover is closed.

For convenience in opening and closing the cover, the receptacle 10 and cover are provided with the projecting hand grips 31—32 respectively.

The manner in which the device is assembled and used, while readily apparent, is briefly as follows:

Assuming the parts are assembled as shown in Fig. 1, and the cover has been moved to open position, the housewife may insert one hand within the compartment 11 and remove a loaf of bread from the compartment, placing it with a single motion upon the bread board 22. At the same time, the knife 21 may be removed with the other hand and the bread cut upon the bread board. After slicing the bread, the bread and knife may be returned to the respective places provided for their reception. The crumbs resulting from the slicing of the bread can be swept into the tray 23 and, as the cover is returned to its closed position, the crumbs will fall into the pocket formed by the member 27. When it is desired to remove the crumb tray 23 the end thereof nearest the flange 14 may be tilted upwardly and the tray slid from under that edge of the bread board 22 which, when the parts are in assembled condition, projects over the tray. If it is desired to remove the bread board 22 the same may be slid longitudinally or towards the right in Fig. 1, to remove the projecting ear 25 of the cleat 24 from under the lug 26, after which the tray may be lifted out of the cover. To replace these parts in position, the bread board is first placed within the cover and slid towards the left in Fig. 1 until its left hand edge is in contacting engagement with the left side of the peripheral flange 14 and with the ear 25 under the lug 26. The crumb tray is then slid laterally under the projecting edge of the bread board and the parts will be retained in position by the lug 26 during both the opening and closing movements of the cover.

For cleaning out the compartment 11, one edge of the knife supporting, front board 19 may be swung upwardly until the board extends approximately diagonally across the open end of the compartment 11 and then the board may be moved outwardly and entirely removed from the receptacle.

In the modified form, shown in Figs. 10 to 14 of the drawings, the receptacle 10a is provided with a pair of side bracket strips 40. These brackets serve as a support for a shelf 41, preferably constructed as a reticulated wire member, and which shelf serves to provide an additional supporting surface within the receptacle. When the shelf 41 is provided, the knife board 19a is of smaller height than shown in Figs. 1, 2, 3 and 8. The construction of the cover 13a and the parts associated therewith are identical to that shown in Figs. 1 to 9 inclusive. The bracket strips 40 are preferably secured in position by a seaming operation in the construction of the receptacle 10a. Instead of making the side wall of the receptacle of a single piece of material as shown in Fig. 1, two or more sections of sheet metal are employed to form the sides of the receptacle 10a. These two strips of material are indicated in Figs. 12 to 14 of the drawings by the numerals 42, 43. The first step of the method of securing the bracket strips 40, 41, in position consists in forming the strips 42, 43 along their edges with the laterally extending bends 42a, 43a respectively. The bracket strip 40 is formed with a turned-over bend 40a as shown in Fig. 12. The strip 43 has its laterally extending bend 43a inserted into the space provided by the bend 40a of the bracket strip as shown in Fig. 13. The bend 42a of the strip 42 is then placed about the outer face of the bend 40a, the parts then being in interlocked engagement in the positions shown in Fig. 13. After this has been done, the parts are then rolled to cause the bends 40a, 42a and 43a to lie in substantial parallelism with the strips 42, 43, thus forming an interlocked seam, indicated generally by the reference character 44 in Fig. 14. This seaming-in process results in the bracket strips 40 being securely held in locked engagement with the side walls of the receptacle in such a manner that they are permanently held in place, will withstand very rough usage, and will not become separated from the receptacle as they would if they were merely soldered in place. The seam 44 not only serves to hold the bracket strips 41 in place, but also serves to form a very substantial strengthening rib which function effectively to maintain the receptacle in its predetermined contour and to resist deformation thereof against such blows as the receptacle would ordinarily have to withstand.

Figure 16:
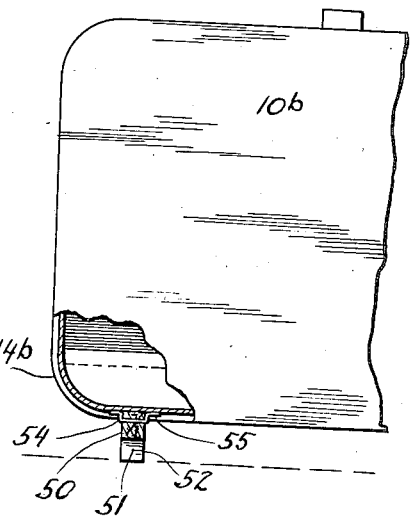
Fig. 16 is a view part in elevation and part in section on the line 16—16 of Fig. 15.
Figure 18:
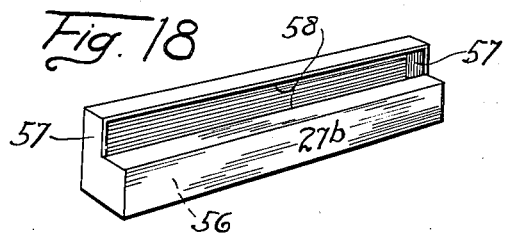
Figs. 18 and 19 are perspective views of a crumb tray and bread board respectively.
Figure 17:
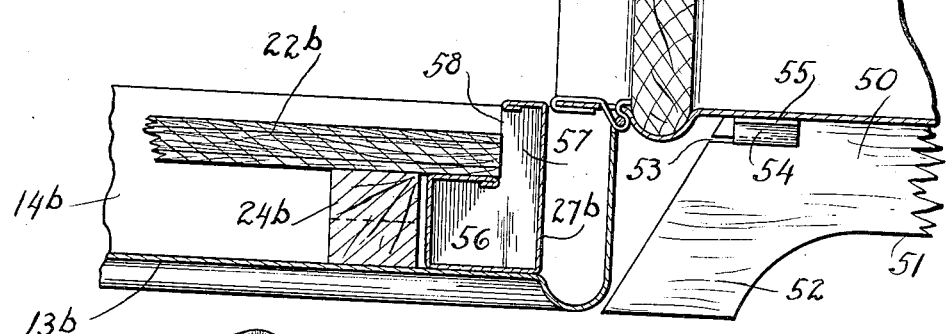
Fig. 17 is an enlarged sectional detail of a portion of a box and cover therefor showing the construction of a crumb tray, and also the means for securing the supporting legs to the box.
Figure 19:
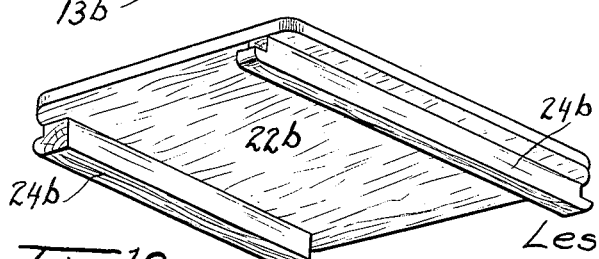

As shown in Figs. 15 to 19 inclusive the box 10b is of the same general construction as hereinbefore disclosed. Instead of employing metallic supporting legs 12 as shown in Figs. 1 and 2, however, for the box 10b, the latter has secured to the bottom thereof, transversely extending supporting standards 50, preferably constructed of wood, the upper face of said standards being plane to contact with the base of the box thereby to brace the same, and the lower portion of said standards being cut away, as indicated at 51, to provide a pair of spaced feet 52. The standard 50 is provided at each end thereof with a slot or kerf 53 (Fig. 17) in which is received the web of a yoke shaped bracket 54, said bracket being provided with laterally extending flanges or ears 55 which are soldered or otherwise secured to the bottom of the box.

Located within the cover 13b of the box is a bread board 22b and crumb tray 27b. The board 22b has its cleats 24b preferably extending longitudinally of the board or, in other words, parallel to the front (or top) flange of the cover. This flange 14b is provided with one or more indentations 26b for engaging the front cleat 24b to hold the board 22b within the cover. The crumb tray 27b is bent to form a crumb holding compartment 56 the walls of which fit under the bread board 22b as clearly shown in Fig. 17, and also to form an upwardly extending portion 57 which is provided along one longitudinal side thereof with a slot or opening 58, which slot, when the tray and board are in position within the cover, faces towards the board and extends slightly above the upper face of said board. Communication between the slot 58 and the compartment 56 is established through the portion 57 so that, as will be readily understood from an inspection of the drawings, any crumbs on the board will, when the cover is moved to its closed position, gravitate through the slot 58 and portion 57 to the compartment 56.

It will be understood that in assembling the standards 50 to the box, the brackets 54 will first be inserted into the kerfs 53 and then the flanges 55 of the brackets will be soldered to the box, the assembling operation being very simple and the standards when soldered being rigidly secured in proper position.

As will be seen from the above, the various members which form the unitary assembly are compactly associated in such assembly in such a manner as to require them to be used in a natural way with a minimum of effort and without any lost motions. Each of the auxiliary devices, the front board 19 for the knife, the bread board 22, and the bread tray 23 co-operates with the part of the receptacle, with which it is respectively engaged, to strengthen and add rigidity to such part. The front board 19 for holding the knife also serves as a closure for the front or open end of the compartment 11, thereby enabling cut slices of bread to be stored and held within the compartment. The means for securing the bread board within the cover also functions to hold the cover in closed position. Not only do the parts function to add strength to the entire device, but, in addition, the construction of such members and the parts with which they co-operate are of marked simplicity thereby enabling the entire assembly to be manufactured and sold at a relatively low cost.

While I have shown certain satisfactory examples of commercially practical, structural assemblies embodying the principles of my invention, it will be understood that many variations, changes, and modifications of the assemblies selected for illustration may be resorted to without departing from such principles.

I claim:

1. The combination with a receptacle having a flanged hinged cover, of means to support said receptacle upon a supporting surface with the pivotal axis of said cover spaced from said surface and so that said cover may be swung from a closed vertical position to an opened horizontal position to be supported in the latter position upon said surface, a bread board seated within said cover, co-operating means on said cover and bread board to hold said board detachably within said cover, and means on said receptacle for engagement with a portion of said co-operating means to hold the cover in closed position.

2. A device of the character described comprising a receptacle having an open compartment and a hinged cover therefor, a strengthening bead formed in the side walls of said receptacle adjacent the open end of said compartment, said bead forming an open recess within the interior of said compartment and a front board detachably fitted within said recess and serving to strengthen said receptacle and partially close the open end of said compartment, and said board being provided with means to support a bread knife with its cutting edge sheathed.

3. In a device of the character described, an open-ended receptacle having a hinged cover, a bread board and a crumb tray, detachably supported by said cover to form therewith a unitary assembly, said bread board and crumb tray serving to reinforce said cover and means detachably supported by the receptacle for supporting a bread knife, and serving to reinforce said receptacle at the open end thereof, and said supporting means, bread board and crumb tray being grouped in juxtaposed relationship at the end of said receptacle when said cover is opened.

4. The combination with a bread box or the like having a flanged cover hingedly secured thereto, of a bread board and crumb tray mounted within said cover, said tray having a crumb receptacle and an open slot above and in communication with said receptacle, and means for detachably holding said tray and board within said cover with said tray adjacent to the hinge axis of said cover and with said open slot adjacent to the upper surface of said board whereby when said cover is swung to its closed position any crumbs on said upper surface will gravitate through said slot into the receptacle of said tray.

5. The combination with a bread box having a flanged cover hinged thereto to swing from a closed vertical position to an open horizontal position, of a bread board and a crumb tray detachably secured within said cover, said tray having a crumb receptacle co-operating with said board and the flange of said cover to be retained within said cover when the latter is moved to its vertical position, and said tray having an open slot extending above and facing towards the upper surface of said board and communicating with said receptacle whereby any crumbs resting on said surface will gravitate through said slot and to said receptacle as said cover is moved from its open to its closed position.

LESTER E. PADELFORD.